March 10, 1964  A. G. BODINE, JR  3,124,076
TUBING COUPLING FOR SONIC PUMP
Filed Feb. 7, 1962

INVENTOR.
ALBERT G. BODINE JR.
BY Lilly & Nyhagen
ATTORNEYS 3,124,076
TUBING COUPLING FOR SONIC PUMP
Albert G. Bodine, Jr., Los Angeles, Calif.
(7877 Woodley Ave., Van Nuys, Calif.)
Filed Feb. 7, 1962, Ser. No. 171,706
3 Claims. (Cl. 103—43)

This invention relates to long pipe strings such as are sunk into deep bores in the earth as in sonic oil pump installations of the class disclosed in my prior Patent No. 2,444,912, and particularly to the couplings between lengths or stands of pipe making up such pipe strings, and to sonic deep well pumps embodying such couplings.

A sonic pump of the class mentioned, and which, as heretofore known, is illustrative of the need for the present invention, operates by virtue of acoustic waves, i.e., periodic elastic deformation waves of tension and compression, transmitted longitudinally down the pump tubing string from a wave generator at ground level to a succession of check valves located at various depths within the tubing string. The tubing string is of elastic material, as steel, so as to constitute a good elastic transmission line for such waves, and is made up in given lengths, connected by tubing couplings. These couplings have, in the past, consisted of sleeves or collars, internally taper-threaded at each end, to receive taper-threaded ends of the individual tubing lengths.

In the wave action characteristic of the pump tubing string of such a pump, local portions of the tubing, in transmitting the waves of tension and compression, travel alternately in opposite directions, longitudinally of the tubing, through limited distances, the wave frequency of this vibration being typically of the order of 20 cycles per second. Lateral unbalance of the tubing or its coupling collars during this desired longitudinal vibration can result in the setting up of parasitic lateral vibrations in the tubing. Laterally unbalanced mass outside the circumference of the tubing, such as may result from even slightly unbalanced tubing collars, contributes heavily to such lateral vibration. Such lateral vibration is highly undesirable, in that it bleeds away useful sonic energy, thereby reducing the longitudinal vibration amplitude of the pipe which is responsible for the pumping effort and tends toward fatigue and failure of the pipe couplings.

A general object of the present invention is therefore the provision of a tubing string coupling which is capable of transmitting longitudinal elastic wave action along the pipe string without the proneness to lateral vibration that is characteristic of the conventional collar type coupling.

In accordance with the invention, the usual coupling collars are dispensed with, and the two meeting ends of the adjacent pipe stands are threaded directly to one another. The meeting end portions of both pipe stands are internally upset, so as to form internally thickened portions, and the internally thickened portions are provided with interengaging taper threads. All mass added for purpose of the coupling is thus inside of the normal inside diameter of the tubing, where it is much less likely to produce lateral vibration than if it were outside the circle of the pump tubing.

A present preferred illustrative embodiment of the invention is shown in the accompanying drawings, in which.

Figure 1:
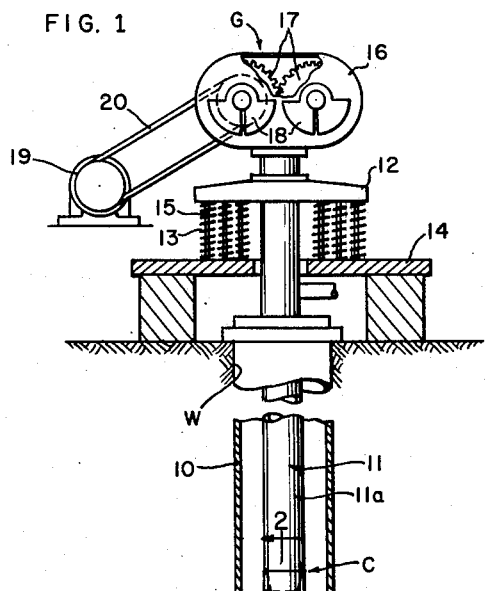
FIG. 1 is a diagrammatic longitudinal sectional view, with parts shown in elevation, of a sonic pumping system making use of the invention.

In FIG. 1 an oil well bore is indicated by the letter W, and a well casing within said bore by numeral 10, the lower end portion of the casing adjacent the productive formation being understood to be perforated in the usual manner. The pump tubing string 11, understood to be composed of elastic material, as steel, is suspended in well bore W from platform 12, its lower end reaching downwardly to the region of the liquid L to be pumped from the well bore. The tubing string is made up in lengths or stands 11a, coupled end to end by couplings such as C. Platform 12 is resiliently mounted on vertical coil springs 13 standing on ground-supported platform 14, springs 13 being guided by vertical rods 15 set into platform 14 and slidable in platform 12.

Mounted on platform 12 or on the upper end of tubing 11 extending thereabove, is a vibration generator or vibrator G comprising a housing 16 containing a device for vibrating the platform 12 and the upper end of the tubing 11, thereby exerting a vertical oscillating force upon the upper end of the tubing 11. The means for generating vibrations contained within housing 16 may be of any type, but that here shown is a simple type having meshing oppositely rotating spur gears 17 carrying eccentric weights 18, which balance out horizontal vibrations but are additive to produce a substantial resultant oscillatory force in a vertical direction. The driving pulley of the vibrator, mounted on the shaft for one of the spur gears, is driven by electric motor 19 through belt 20. Since this vibrator is employed to generate elastic waves in the pump tubing which are in the same nature as sound waves, and travel with the speed of sound waves in the pipe, I may refer to this vibrator as a sonic wave generator.

The oscillating force applied to the upper end of the elastic tubing 11 by the sonic wave generator launches alternating deformation waves of tension and compression down the tubing, traveling in the tubing with the speed of sound. It must be understood that the tubing is not vertically reciprocated in a bodily manner. On the contrary, the vertically oscillating force applied to the upper end of the tubing by the sonic wave generator is of sufficiently high frequency (for instance, although without implying any limitation on the invention, 20 cycles per second for a 4,000 foot tubing) as to make that type of operation impossible. Instead, longitudinal elastic deformation waves of compression and tension, of wave length actually shorter than the length of the tubing string, travel down the tubing string, causing each transverse section thereof to oscillate vertically with each passage of a wave.

At certain of the tubing couplings there are located fluid impelling and check valve elements 22 (see FIG. 3), as will be described in more particular hereinafter. The general operation of the pump is described in my aforementioned Patent No. 2,444,912, and reference is also made to my Patent No. 2,702,559. It will suffice here to say simply that the pump operates by vertically vibratory influences applied to the fluid impelling and check valve element 22, the vertically vibratory impulses being obtained from the elastic vibration waves transmittal down the pump tubing string. The fluid impelling and check valve means are located in vertically vibratory regions of the tubing string, and in this manner, as more fully described in my aforesaid patents, well fluids are pumped up the tubing string, to be delivered via outlet pipe 23.

Figure 2:
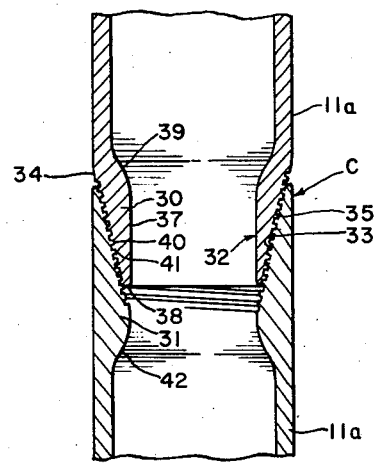
FIG. 2 is a vertical longitudinal section of a coupling taken on line 2—2 of FIG. 2.

Considering the tubing coupling in more particular, and with particular reference to FIG. 2, two adjacent tubing lengths 11a are screwed together at coupling C. The lowermost end portion of uppermost tubing length 11a is formed with an internally upset portion 30 in the shape of an externally threaded "pin" 32, and the uppermost end portion of the lowermost tubing length 11a is formed with an internally upset portion 31 in the shape of an internally threaded "box" 33.

Pin 32 is externally tapered in a downward direction, beginning at a point 34 on the normal outer circumference of the tubing, and extending to the lower extremity of the pin. This tapered pin is formed with screwthreads 35.

The internally upset portion 30 is defined on the inside in the illustrative embodiment by a cylindrical bore 37, which defines the inner margin of the lower annular extremity 38 of the pin, and which, at the top, joins the inside surface of the tubing side wall through a curved or "streamlined" shoulder 39, which begins just below the beginning point 34 of the taper, and merges with the tubing side wall somewhat above the point 34, as illustrated.

Box 33 is internally tapered correspondingly to pin 32, as at 40, and is furnished with internal screwthreads 41. The outside of the box 33 is defined by the normal outside diameter of the tubing wall. It will be seen that the upset tubing portion 31 affords the necessary taper, or reduction in inside diameter in the downward direction; and the portion 31 is thickest at and just below the lower extremity of the taper threads, below which the portion 31 is curved outward to merge with the normal inside surface of the tubing side wall in a streamlined fashion, as indicated at 42. The inside diameter of the box 31, at its smallest dimension, will be seen to correspond with the inside diameter of bore 37.

The two coupling parts, both formed by internally upset portions of the tubing walls, will be seen to constrict the oil flow passage only slightly, while affording a tubing coupling for a sonic pump characterized by elimination of mass outside the normal outside diameter of the tubing. This elimination of outside coupling mass greatly deters the tendency for the setting up of parasitic lateral vibration in the pump tubing, as described hereinabove.

Figure 3:
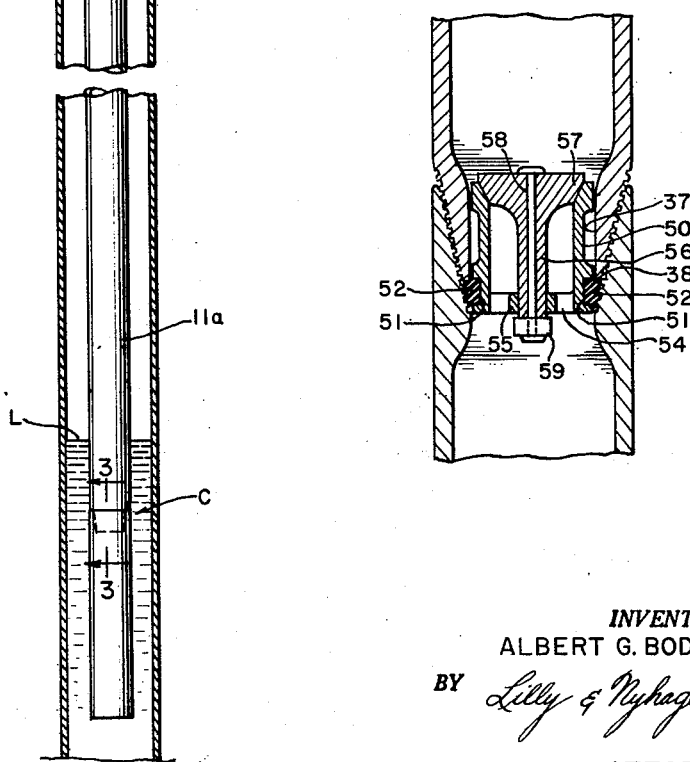
FIG. 3 is a similar view of a similar coupling, but incorporating a check valve, the view being taken on line 3—3 of FIG. 1.

FIG. 3 shows how the coupling of the invention may be utilized to support a check valve of the sonic pump. The check valve in this instance comprises a sleeve 50, receivable with some clearance in the coupling bore 37, and formed around its lower end with a circumferential groove 51 wherein is seated a resilient mounting ring 52, composed of deformable rubber or the like. The ring 52 is gripped and compressed between the large lower end portion of the taper-threaded box 33 below and the lower annular extremity 38 of the pin 32 above. Sleeve 50 has at the bottom a spider 54 through the center portion 55 of which is freely reciprocable a stem 56 on a check valve disk 57 which is adapted for seating within the upper end of sleeve 50. Pin 58 with stop collar 59 limits the amplitude of vertical reciprocation of the valve disk 57 and stem 56 relative to sleeve 50 and the seat at the upper end of the latter. It will be understood that disk 57 opens and closes the valve in step with vertical vibratory movements of the pump tubing in the region of the valve.

The present preferred embodiment has now been illustrated and described, but it will be understood that this embodiment is for illustrative purposes only, and that various changes in design, proportion and arrangement may be made without departing from the scope of the appended claims.

I claim:

1. A deep well pump which includes: an oscillatory fluid impelling pumping member adapted for placement in the well, a sonic wave generator located at the ground surface, and an elastic pump tubing string operatively interconnecting said sonic wave generator and said oscillatory fluid impelling pumping member, said elastic tubing string being adapted to transmit elastic deformation waves of compression and tension longitudinally therethrough from said generator to said pumping member, said tubing string comprising at least two coupled lengths of elastic tubing having adjacent ends, an internally upset, externally tapered and screw-threaded coupling pin portion on said adjacent end of one of said two tubing lengths, and an externally flush, internally tapered and screwthreaded box portion for said pin on said adjacent end of the other of said two tubing lengths, the entirety of said coupling portions being located inside the perimeter of the lengths of tubing.

2. A deep well pump which includes: an oscillatory fluid impelling pumping member adapted for placement in the well, a sonic wave generator located at the ground surface, and an elastic pump tubing string operatively interconnecting said sonic wave generator and said oscillatory fluid impelling pumping member, said elastic tubing string being adapted to transmit elastic deformation waves of compression and tension longitudinally therethrough from said generator to said pumping member, said tubing string comprising at least two coupled lengths of elastic tubing having adjacent ends, an internally upset, externally tapered and screw-threaded coupling pin portion on said adjacent end of one of said two tubing lengths, and an internally upset internally tapered and screw-threaded box portion for said pin on said adjacent end of the other of said two tubing lengths, the entirety of said coupling portions being located inside the perimeter of the lengths of tubing.

3. A deep well pump which includes: an elastic tubing string made up of a plurality of tubing lengths, a sonic wave generator coupled to said tubing string and operable to generate cyclic elastic waves in said tubing string which waves are transmitted therealong, fluid impelling means mounted in said tubing string in energy transmission relationship so that said impelling means will be actuated by said transmitted waves, two tubing lengths of said tubing string being joined by a substantially externally flush joint comprised of an internally upset, externally tapered and screwthreaded coupling pin portion on the end of one of said tubing lengths, said coupling pin portion being disposed inside the perimeter defined by the original outside diameter of the tubing, and an internally upset, internally tapered and screw-threaded box portion for said pin portion formed on the end of the other of said tubing lengths, the entirety of said coupling being located inside the perimeter of the lengths of tubing.

References Cited in the file of this patent

UNITED STATES PATENTS

| | | |
|---|---|---|
| 1,325,073 | Boyd et al. | Dec. 16, 1919 |
| 1,927,656 | Eaton et al. | Sept. 19, 1933 |
| 2,006,520 | Stone et al. | July 2, 1935 |
| 2,062,407 | Eaton | Dec. 1, 1936 |
| 2,444,912 | Bodine | July 13, 1948 |
| 2,702,559 | Bodine | Feb. 22, 1955 |
| 3,067,593 | McCool | Dec. 11, 1962 |